(12) United States Patent
Xie

(10) Patent No.: US 6,588,552 B2
(45) Date of Patent: Jul. 8, 2003

(54) BRAKE

(76) Inventor: Xingyun Xie, Tongzi Po. Hexi, Changsha, Hunan Province (CN), 410013

( * ) Notice: Subject to any disclaimer, the term of this patent is extended or adjusted under 35 U.S.C. 154(b) by 0 days.

(21) Appl. No.: 09/994,570

(22) Filed: Nov. 27, 2001

(65) Prior Publication Data

US 2002/0033308 A1 Mar. 21, 2002

Related U.S. Application Data

(62) Division of application No. 08/765,994, filed as application No. PCT/CN95/00055 on Jun. 30, 1995, now Pat. No. 6,374,963.

(30) Foreign Application Priority Data

| Jul. 2, 1994 | (CN) | ........................................ 94111061 A |
| Jun. 28, 1995 | (CN) | ........................................ 95106603 A |

(51) Int. Cl.⁷ ................................................. B60T 13/04
(52) U.S. Cl. ........................ 188/166; 188/68; 192/18 R
(58) Field of Search ............................ 188/166, 68, 69, 188/170, 171; 192/18 A, 18 R, 12 R

(56) References Cited

U.S. PATENT DOCUMENTS

| 2,783,861 A | * | 3/1957 | Jungles ........................ 188/134 |
| 2,838,150 A | * | 6/1958 | Eason ........................... 192/144 |
| 4,122,926 A | * | 10/1978 | Spanke et al. ............. 192/12 R |
| 4,135,611 A | * | 1/1979 | Spanke .................... 192/110 B |

\* cited by examiner

*Primary Examiner*—Pam Rodriguez
(74) *Attorney, Agent, or Firm*—Pennie & Edmonds LLP

(57) ABSTRACT

The present invention relates to a brake, which has a fixed seat, a friction brake shoe, a braking part, a braking spring, an acting block, and a driving block. The acting block is connected with a driving member and matched on an acting face of the driving block. The driving block is connected with the braking part. The braking spring has a first end connected with a driven member and a second end connected to the braking part. The braking part is articulated on the driven member by a support pin. The braking part can be engaged with the friction brake shoe or disengaged from the friction brake shoe, and connected with a driven member. In a normal operation or still state, the brake is capable of braking or releasing braking without additional power.

5 Claims, 9 Drawing Sheets

BRAKE

CROSS REFERENCE

This application is a division of U.S. application Ser. No. 08/765,994 filed Apr. 14, 1997, which was the U.S. National stage of International Application No. PCT/CN95/00055 filed Jun. 30, 1995, now issued as U.S. Pat. No. 6,374,963 on Apr. 23, 2002.

FIELD OF THE INVENTION

This invention relates to a mechanical braking apparatus for use in retarding moving bodies.

BACKGROUND OF THE INVENTION

Generally brakes, whether powered mechanically, electromagnetically, or by electromagnetic hydraulic devices, all require rather complicated, energy-consumable power producers. For instance, presently, brakes that are normally closed demand an additional power producer to deliver an external force to relieve them. Citing another example, the electromagnetic clutched brake has a normally closed state that uses spring force for braking and retarding a body. But when the body has to run or rotate, an electromagnet must be energized to produce electromagnetic force against the spring force to relieve the normally closed brake.

U.S. Pat. No. 2,783,861 discloses a drive-released brake, wherein the connecting mechanism is out of the transmission chain. More particularly, when the drive shaft 11 rotates the driven shaft 12 against a resisting load, the driven member 17 and the floating brake member 22 are each brought into a neutral or aligned position by the arm 16. Also, adjacent to the driven member 17 is a floating brake member 22 formed with a plurality of peripheral notches 23. The driven member 17 and the floating brake member 22 are each formed with three equal-spaced opposed radially extending V-shaped depressions, arranged so that they will be directly aligned. The brake and the release, as well as the power/torque transmission, are directly realized. Braking or relief of the braking, associated with the driving member 14 against the driven member 17, needs a driving power source. This structure evidently is rigidly connected, rather than elastically connected, wherein a ball retainer 29 and an antifriction ball bearing 28, and the above-mentioned V-shaped inclined ramps 26 and 27, only play a role in increasing power and do not take part in the power/torque transmission.

On Apr. 26, 1989, the Gazette of Patent for Chinese Invention disclosed a patent having application number 87102097, entitled "Braking apparatus employing the brake force transformed from the inertial force". In this patent, the braking apparatus comprises an additional power producer, a servo mechanism, brake mechanism, and reinforcement mechanism. The main external braking force is converted from the inertial force of the moving body, resulting in retarding the body. This apparatus has the features of short braking time, fast release, and working reliability. However, an additional power producer is still required to provide a brake operating force in its normal kinematics state, and a certain amount of energy must be consumed in the operation of the additional power producer.

In view of the previous facts, the invention is the further development of, and a major improvement over, current technology, including the aforesaid patent. The invention proposed is an apparatus having a compact structure, that achieves braking or the release of braking without additional power in its normal operation, or static, state.

Another object of the invention is to provide an apparatus that can apply braking or the release of braking by using the relative movement between the driving member and the driven member that emerges after the time that the driving member and driven member start and end their transmission.

A further object of the invention is to provide an apparatus that achieves braking or the release of braking by employing the concave-convex mating surface of the connecting mechanism between the driving member and the driven member.

CONTENT OF THE INVENTION

First, in order to illustrate the content of the invention concisely, and for convenience, the implications of certain terminology in the invention description, "driving member", "driven member", "a first direction movement", "a second direction movement", etc., are shown as follows.

"Driving member" and "driven member": The driving member and driven member are not key structural elements of the brake invention, but they are the members used to connect the brake invention to the apparatus applying the brake invention. Regarding its relation to transmission, the driving member is located at the driving end, and the driven member is located at the driven end.

"A first direction movement": This indicates the common movement carried out by the driving member when bringing the driven member into action, and also demonstrates the common movement made by the driving member and acting block. It also indicates the common movement carried out by the driven member and driving block. A first direction movement is called common movement for short.

"A second direction relative displacement": This indicates the relative displacement made by the driving block or braking part relative to the friction surface on the fixed seat, or the relative displacement of the fitting or disengaging movement relative to the driven member or acting block, i.e., the relative movement or displacement when realizing braking or relieving braking. Therefore, a second direction relative displacement is also presented as the relative displacement of the fitting or disengaging movement.

The invention relates to a brake that comprises the connecting mechanism, enabling the driving member to bring the driven member into their common movement (i.e. movement taken along a first direction), a fixed seat having a friction surface, and a braking part which may engage or disengage the friction surface on the fixed seat, thereby achieving braking or the relief of braking for the driven member. According to the invention, the connecting mechanism is installed between the driving member and the driven member, and comprises a force switching mechanism. The force switching mechanism comprises an acting block, which may carry out a common movement (i.e. a first direction movement) with the driving member, and enables the braking part to produce relative displacement (i.e. a second direction relative displacement) by engaging or disengaging movement.

The acting block and driven block have a mating structure enabling relative movement when the driving member acquires active force or loses active force. The mating structure causes the driving block to have relative displacement (i.e. a second direction relative displacement) causing engaging or disengaging movement relative to the driven member, thereby realizing braking or relieving braking for the driven member.

The connecting mechanism also comprises a limiting mechanism in use for restricting the distance of relative motion between the acting block and driving block, when the braking or relief of braking is accomplished, the limiting mechanism ensuring that the driving member brings the driven member into their common movement (i.e. a first direction movement).

Also, in the brake, the movement taken along a first direction may be rotation.

Also, in the brake, the limiting mechanism can comprise a spring holding down the acting block, to ensure that after relative movement of the acting block and the driving block, they have adequate coactive force to carry out joint movement.

Also, in the brake, the limiting mechanism can comprise: A disc part connected to the driving member, wherein the disc part is installed with many pin shafts outside its center; and a disc part on the driven member, corresponding to the position of the pin shaft, wherein many long holes are installed along a circular arc direction on the disc part of the driven member, the pin shaft being movable relative to the long hole herein and finally suppressed to contact a certain end of the long hole.

Also, in the brake, the driving member and driven member may be installed up and down, the limiting mechanism comprising a disc part connected with the driving member, wherein many pin shafts are installed outside the center of the disc part, and a disc part connected with the driven member, corresponding to the position of the pin shaft, wherein many long holes are arranged in the circular arc direction on the disc part connected to the driven part, and wherein the pin shaft may finally contact a certain end of the long hole.

Also, in the brake, the mating structure that makes a relative movement between the acting surfaces of the acting block and driving block is a cam mating structure, and either the acting surface of the acting block or the acting surface of the driving block may be a cam surface, or both the acting surfaces of the acting block and the driving block are cam surfaces. When there is relative rotation between them, the driving block is able to produce a displacement (i.e. displacement relative to an engaging or disengaging movement) along a second direction relative to the acting block, thereby realizing braking or relieving braking.

Also, the brake can comprise a driving block movable relative to (i.e. second direction relative displacement) the axial direction of the rotating driven member, viz, a second direction relative displacement made by the driving block may be arranged in the axial direction of the rotating driven member.

Also, the brake can comprise a driving block movable relative to (i.e. second direction relative displacement) the radial direction of the rotating driven member, viz, a second direction relative displacement made by the driving block may be arranged in the radial direction of the rotating driven member.

Also, in the brake, the braking part and a disc part linked with the driven member become an integral structure by joining the compensation system and sliding key. The braking part is a disc having an inner gear ring. The disc part and the core enable the compensation system and sliding key to be set up. The compensation system is located between the disc and core. The sliding key causes common movement of the disc and core (i.e. first direction movement). The compensation system comprises the notch located at the edge of the core, a tooth block having teeth in the notch and matching with the disc, and a spring located between the tooth block and the bottom of the notch.

Also, in the brake, the two end faces of the acting block may be a structure mating with two driving blocks, respectively. Thus, the two end faces of the acting block taken along the axial direction of the rotating driven member may be concave and convex, such that the two end faces simultaneously mate with the two driving blocks.

Also, in the brake, the friction surface on the fixed seat may be a conical surface, flat surface, or cylindrical surface.

Also, in the brake, the first direction movement (i.e. common movement) can also be rectilinear movement, the brake comprising a driving block making a second direction relative displacement (i.e., displacement relative to an engaging or disengaging movement) along the vertical direction of the driven block that is making rectilinear movement, viz, a second direction relative displacement may be along the vertical direction of the driven member that is making rectilinear movement.

The previous description of conception and other objects and advantages will be further clarified by reference to the attached drawings illustrating the embodiment.

FIG. 1 to FIG. 5 illustrate the first embodiment of the invention.

THE PREFERRED REALIZATION MODE OF THE INVENTION

FIG. 1 to FIG. 5 illustrate the first embodiment of the invention.

Figure 2:
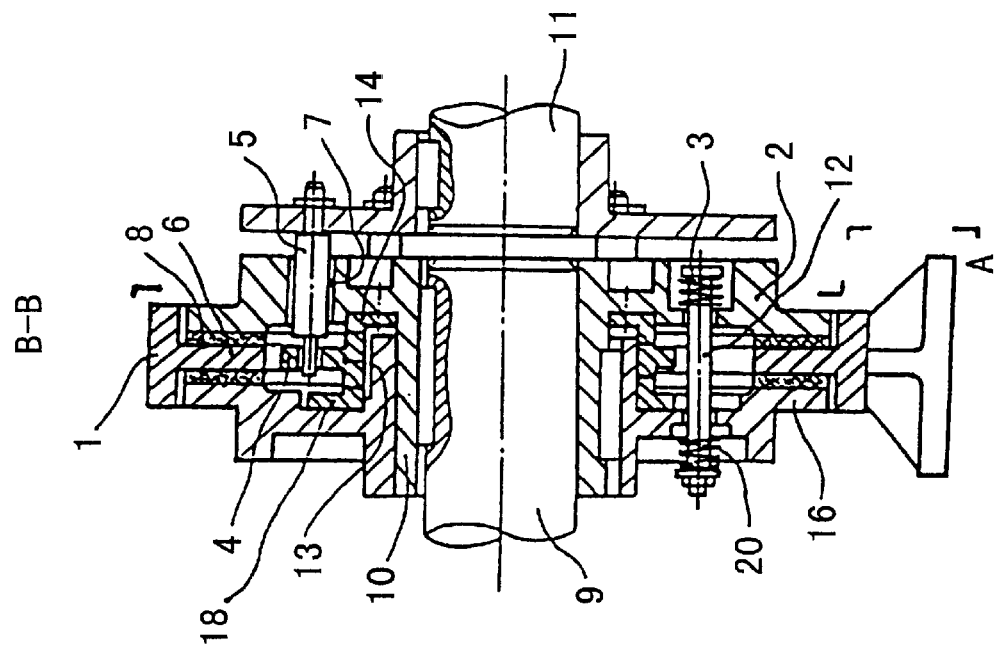
FIG. 2 is a cross-sectional view taken along the B—B line in FIG. 1.
Figure 1:
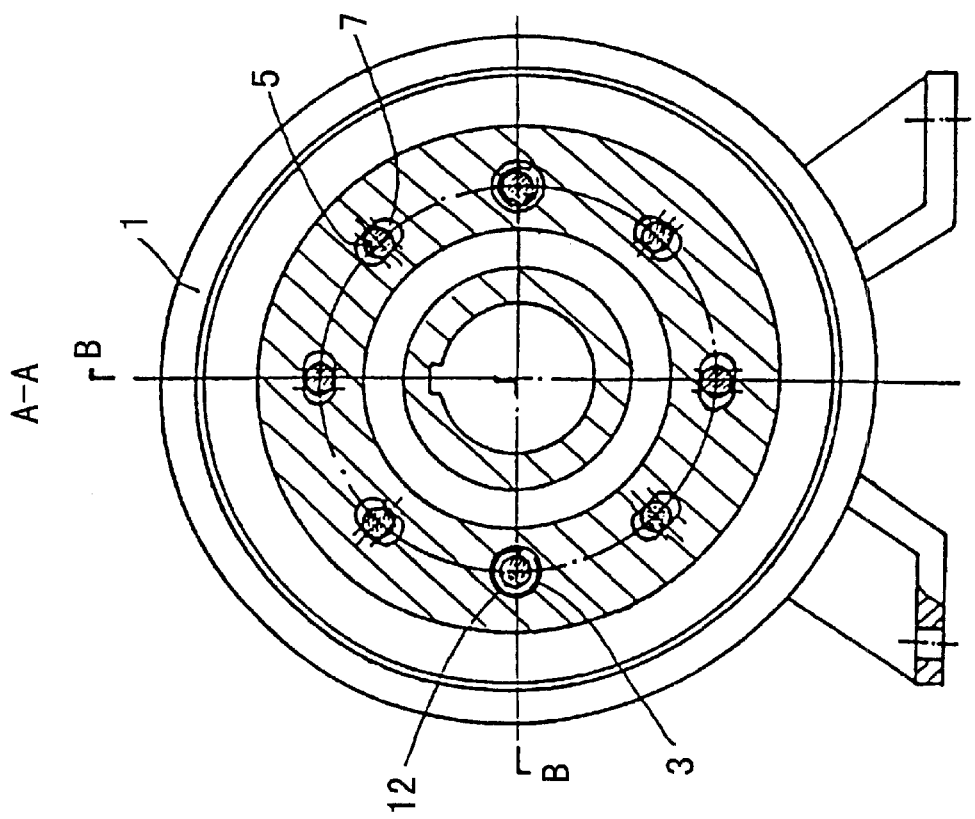
FIG. 1 is a cross-sectional view of the first embodiment of the invention taken along the A—A line in FIG. 2, illustrating the structure of the sliding pin, sliding hole and connecting rod.

It is a normally closed brake, comprising the fixed seat 1, the braking part 2, the tripping spring 3, and the force switching mechanism 4. Moreover, there are the driven member 9 and driving member 11. Its structure and interconnecting relation is as follows: The brake shoe 6 is installed on the fixed seat 1 (the two are merged into a whole). The braking friction surface 8 of the braking part 2 may be a flat surface or conical surface, clutching the friction surface of the brake shoe 6 thereby to realize or release the brake. FIG. 2 shows the close contact state of the friction surface of the brake shoe 6 and the friction surface of the braking part, i.e., in the braking state.

On the braking part 2, a sliding hole 7 directed in a circular arc and an axle sleeve 10 used for linking with the driven member 9 are installed. The sliding hole 7 has a certain length taken along the circular arc direction. Since the braking part 2 and the axle sleeve 10 are merged into a whole part, when the braking part 2 and the brake shoe 6 are in the braking state via close contact, braking of the passive driven member 9 is therefore realized via axle sleeve 10, and through mating of the axle sleeve and driven member 9. The braking part 2 is, by way of sliding, taken along axial direction relative to the driven member 9.

One end of the connection rod is mounted on the braking part 2. The spring 3 is also mounted on that end of the connecting rod, its spring force exerted on the braking part 2. When the brake is in the braking state, via the action of the spring 3, the braking part 2 closely contacts the brake shoe 6 (the action of the brake shoe 6 and the spring 20 are described hereafter).

Figure 3:
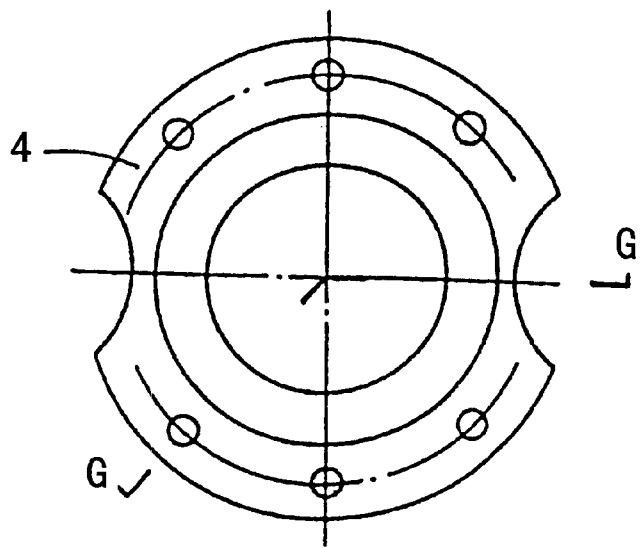
FIG. 3 is an axial-sectional view of the force-switching mechanism.
Figure 4:
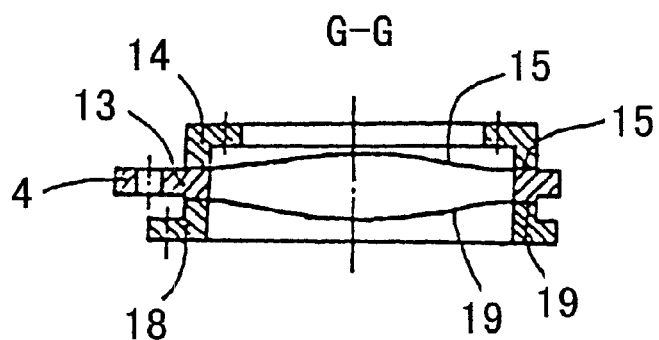
FIG. 4 is a cross-sectional view taken along the G—G line in FIG. 3.
Figure 5:
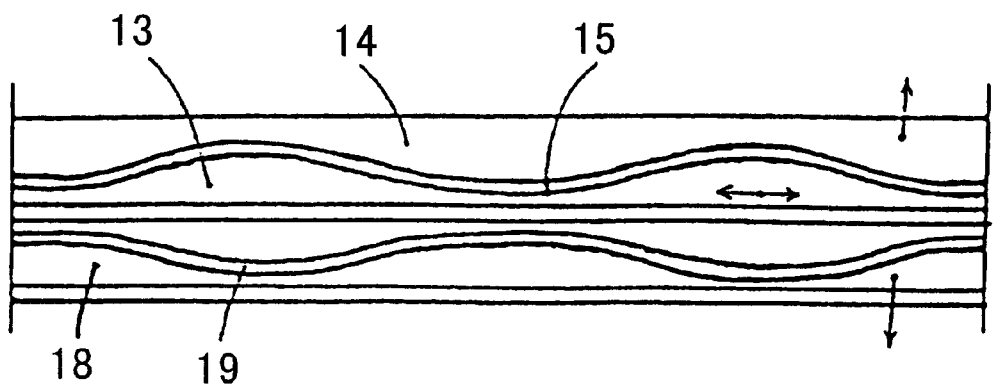
FIG. 5 is an exploded view of the concave-convex mating surface of the acting block and driving block.
Figure 7:
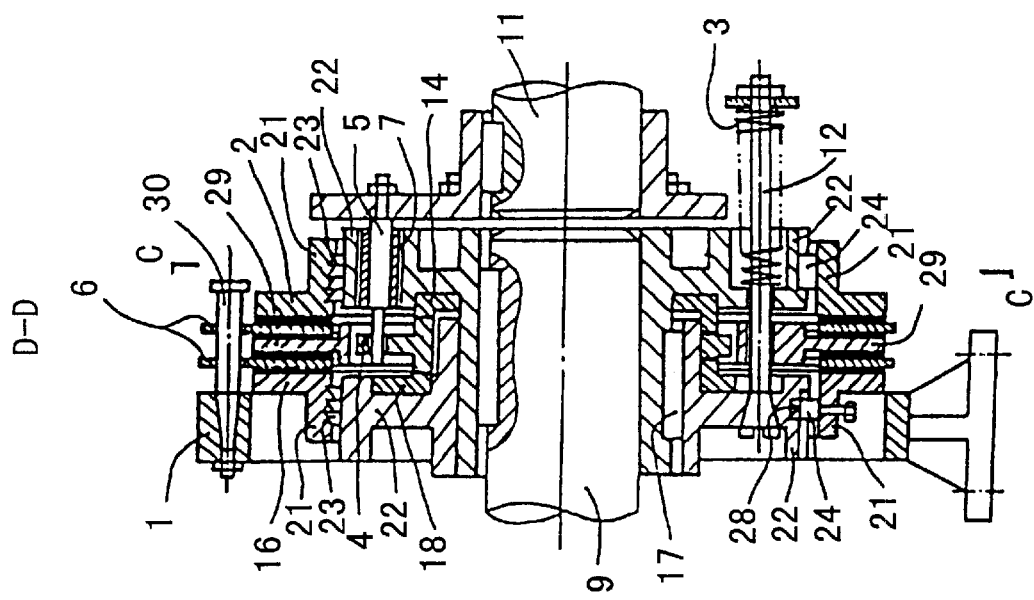
FIG. 7 is a cross-sectional view taken along the D—D line in FIG. 6.
Figure 6:
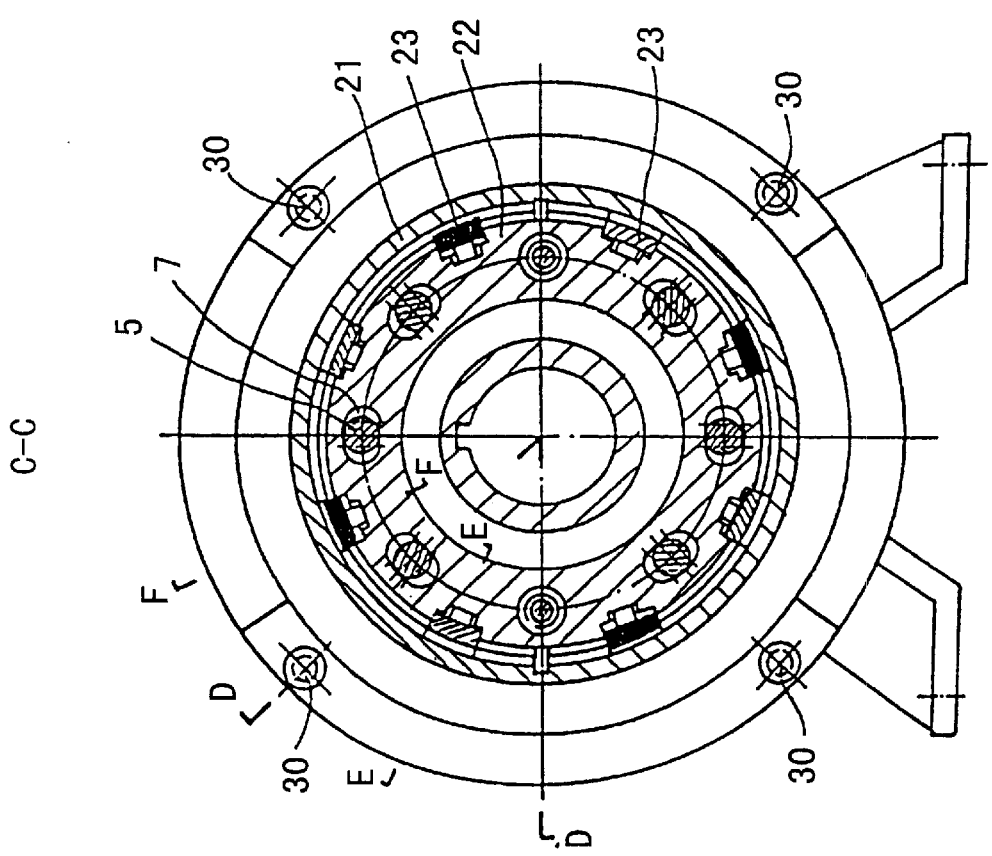
FIG. 6 is cross-sectional view of the second embodiment of the invention taken along the C—C line in FIG. 7.
Figure 8:
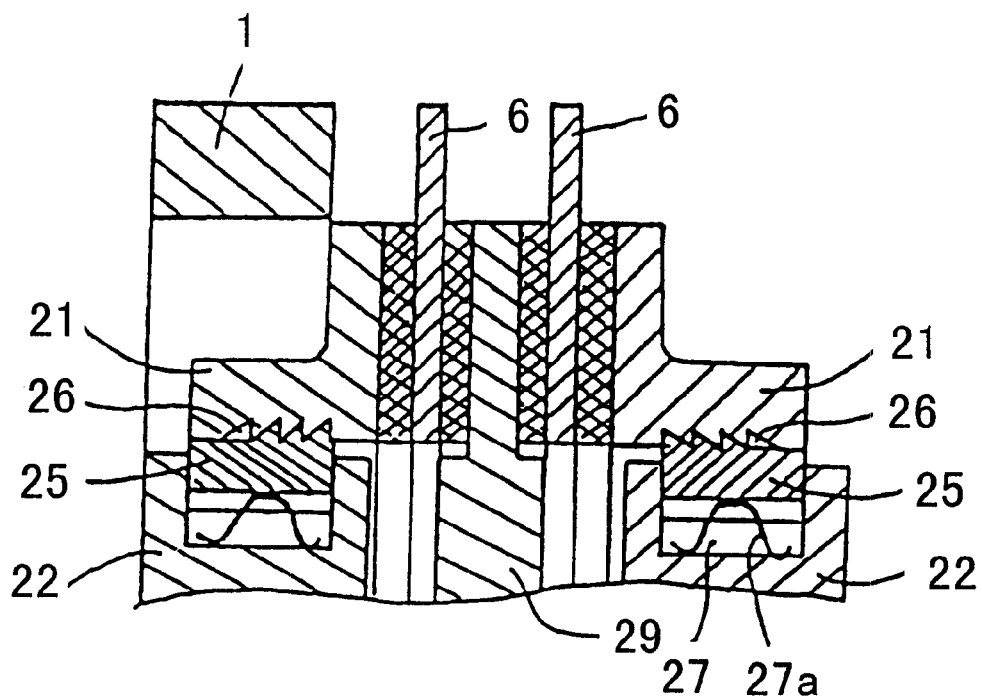
FIG. 8 is a cross-sectional view of the compensation system taken along the E—E line in FIG. 6.
Figure 9:
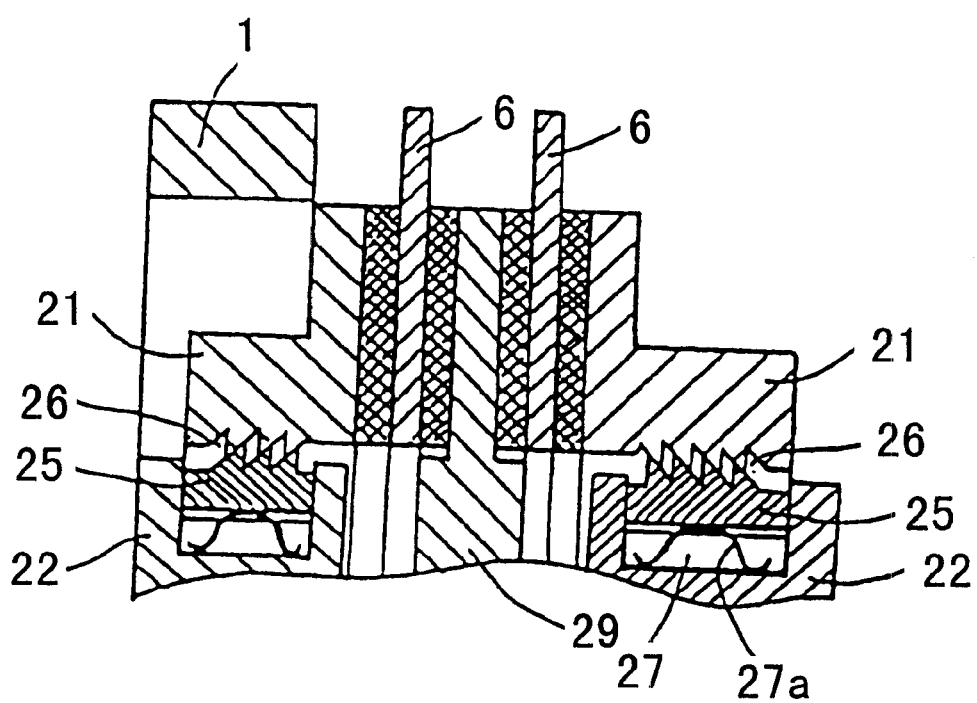
FIG. 9 is a cross-sectional view of the compensation system taken along the F—F line in FIG. 6.

The force switching mechanism 4 comprises the acting block 13 connected with the driving member 11 and the driving block 14 secured with the braking part 2 (refer to FIG. 3 to FIG. 5). The contact surface of the acting block 13 and driving block 14 is the concave-convex mating contact surface 15 (equivalent to the driven member of the cam mechanism which also has a cam surface). When the driving part acquires an active force, it sets the acting block into rotation, whereupon the cam segment moves towards the cam of the driving block 14 and exerts a thrust on the driving block 14 to bring the driving block 14 into axial movement (as shown by the arrow in FIG. 5), thereby taking the driven member 2 against the acting force of the spring 3 and moving it outwards. As a result, the braking friction surface of the braking part 2 separates from the brake shoe 6 and releases braking.

The sliding pin 5 is located in the sliding hole of the braking part 2. One end is connected with the driving member 11, and another end is matched with the acting block 13 of the force switching mechanism 4 (see FIG. 1). The sliding pin is movable relative to the sliding hole therein. By means of the displacement of the sliding pin 5, which is emerged in the sliding hole 7, the acting block 13 is set into rotation, and then the braking part 2 is driven to move via the driving block 14.

The invention relieves normally closed braking, wherein the process taking the passive driven member 9 into normal movement is: When the driving member 11 is started by an active element like a motor and is beginning to run, the driving member 11 obtains active force and then starts to rotate and displaces the sliding pin 5 in sliding hole 7. Another end of the sliding pin 5 sets the acting block 13 of the force switching mechanism into rotation. Then, the acting block 13 exerts a thrust on the driving block 14, using the driving block 14 to move braking part 2 outwards and gradually relieve braking. When the braking is not yet completely relieved, the passive driven member 9 still retains a static state. When the sliding pin 5 is displaced to one end of the sliding hole 7, braking is completely relieved. Presently, the sliding pin 5 acts as the transmitting axis of the torque to bring the braking part 2 into rotation. Then, the passive driven member 9 in the axle sleeve 10 of the braking part will start normal movement. Specifically, using the lead time between the first rotation of the driving member 11 and the temporal static state of the driven member 9, through the displacement of the sliding pin 5 in the sliding hole 7, the acting block 13 is brought into rotation, enabling the driving block 14 to move the braking part 2 outwards and relieve braking. When the braking is completely relieved, the passive driven member runs normally, and the acting block 13 of the force switching mechanism turns by the action of the sliding pin 5. It is ensured that the convex segment on the acting block 13 reliably contacts the convex segment on the braking block 14 as a result of the restricted position of the sliding hole 7. The braking is thereby held to a relieved state.

The process of recovering the normally closed braking state is, when braking is needed, to cut off the power source of the driving component (like a motor). Because of the loss in active force, the driving member 11 decelerates due to the reaction torque relative to running, and then the sliding pin 5 makes a reverse displacement relative to starting in the sliding hole 7, bringing the acting block 13 into a relevant reverse rotation. This makes the convex segment of the acting block 13 move towards the concave surface segment on the driving block 14, until the thrust between the acting block and the driving block is canceled. Since the tripping spring 3 is exerted on the braking part 2, the braking part 2 is therefore held down by the spring 3 to contact the brake shoe 6, and a resistance via friction emerges to stop the movement of the braking part 2. The passive driven member 9, connected to the braking part 2 and axle sleeve 10, retards correspondingly, i.e. realizing braking.

One should be reminded that the above-mentioned description only relates to the mating situation of an axial flank of the acting block 13 as the acting surface for matching with the cam acting surface of the driving block 14. However, it is actually a mating structure of the acting block 13 fitting with the two driving blocks 14 and 18 as shown in FIG. 1 to FIG. 5 (refer to the lower part of the acting block in FIG. 5), and not only the braking part 2, but also another braking part 16, that exists in the structure. As a matter of fact, the braking part 16 may not be installed in this embodiment, as can be known from the previous description. Generally, the action of a braking part 2 is adequate, and a simple plate may be replaced on the position of the braking part 16, while the other end of the connecting rod 12 may be connected to the plate. Hereafter, the second embodiment of the invention shall be described in detail for the structure with the braking part 16. (Another driving block 18, contact surface 19, and the tripping spring 20 are shown in FIG. 4 as follows).

One should also be reminded that the interconnection relation of the driven member and driving member in the embodiment is actually equivalent to an elastic coupling.

The second embodiment of the invention is shown in FIG. 6 to FIG. 9, in which the same or similar parts in the above-mentioned embodiment are scaled out in the same labels.

A braking part 16 corresponding to the braking part 2 is installed on the other side of the brake shoe 6, and the braking friction surface of the braking part 16 corresponds to the clutching of another flank of the brake shoe 6. Another end of the acting block 13 sets up the driving block 18 corresponding to the driving block 14 (refer to FIG. 4, FIG. 5), and the convex-concave contact surface 19 of the acting block 13 and the driving block 18 are symmetrical to the contact surface 15. A sliding key 17 is installed between the axle sleeve of the braking part 16 and the axle sleeve of the braking part 2 to bring the two members into their common movement and to stop simultaneously, and the two braking parts are movable relative to each other, as taken along the sliding key in the axial direction. The two ends of the connecting rod are connected to the braking part 2 and braking part 16, respectively. The spring 3 is mounted at the end of the connecting rod 12 on the braking part 2, and the elastic force of the spring is exerted on the braking part 2. A spring 20, symmetrical to the spring 3, may be mounted at another end of the connecting rod 12 (refer to FIG. 2). The spring force of the spring is exerted on the braking part 16. Moreover, the other end of the connecting rod 12 can also be secured on the braking part 16, and the spring 3 acts on the braking part 16 via the connecting rod 12 (see FIG. 7). Friction lining is installed on the braking friction surface of the braking part 2 and braking part 16. In order that they act evenly, at least two sliding pins 5 and corresponding sliding holes 7 shall be installed and symmetrically, uniformly distributed there. There are 6 sliding holes 7 on the braking part 2 of the embodiment (see FIG. 6), and there are 6 relevant sliding pins 5. In order that they be evenly acted upon, at least two connecting rods 12 used for linking braking parts shall be installed and set up in symmetric homogeneity. There are two tripping springs 3 in the embodiment, and two tripping springs 20 may be used or may not be installed.

The working process of releasing the braking state in the second embodiment of the invention is as follows. Acting block 13 turns according to the rotation of the sliding pin 5 when driving member starts acquiring active force, and exerts an outward thrust on the driving block 14 and driving block 18 located at the two ends. This enables the braking part 2 and braking part 16 to move outwards simultaneously to depart from the brake shoe 6 to achieve the relief of the normally closed braking, resulting in normal operation of the passive driven member. When the driving member loses the active force, the acting block 13 turns in the opposite direction, following the sliding pin 5, enabling the convex surface segment of the acting block to move towards the concave surface segment, canceling the thrust. The tripping spring 3 and tripping spring 20 act on the braking part 2 and braking part 16 respectively, or are exerted on the braking part 2 and braking part 16 by tripping spring 3 via connecting rod simultaneously, moving the two braking parts inwards to make tight contact with the brake shoe 6 and recover the normally closed braking state.

In the embodiment 2, both the braking part 2 and braking part 16 can also be composed of the disc 21 having internal teeth and the core 22, and a braking compensation system 23 and a sliding key 24, which enable the disc and core to run and stop simultaneously and are installed between the disc 21 and the core 22. The sliding key 24 is also used to ensure balance of the mounting structure of the disc taken along the core. In the embodiment, the brake compensation system on the braking part 2 and the braking part 16 are symmetrically installed. The brake shoe 6 has a biplate structure, and a sliding connection is achieved by the supporting shaft 30. Additionally, in the biplate brake shoe 6, an intermediate inner disc 29 is installed on the connecting rod 12 to enhance the friction force in braking. The brake compensation system is an improved gear ring structure, i.e.: Gear ring 26 is installed in the inner circle of the disc 21, and tooth block 25 is set up on the circle of the core 22 (refer to FIG. 8, FIG. 9) and has external teeth mating with the gear ring 26. The outboard of each tooth is a slope, and inside is a vertical plane perpendicular to the axis of the drive shaft. The gear ring 26 and the tooth block 25 may be flank matched. The spring 28 is installed in the bottom of the sliding key 24, which may be adjusted by a screw. The disc 21 and core 22 are set to turn along the thread, to carry out manual adjustment of the friction spacing. The tooth block 25 is set up in the notch 27, and has a circular formation in the core 22. The spring 27a, exerted on the tooth block 25, is installed in the bottom of the notch 27 (see FIG. 8). The tooth blocks 25 are set up in pairs; there are four pairs with eight blocks in total in the embodiment, in which some of them are evenly arranged in pairs (four pairs in the embodiment, which are not blackened in FIG. 6) in complete contact (see FIG. 8). Moreover, homogeneously arranged in pairs (four blackened in FIG. 6) are tooth blocks 25 in partial contact (see FIG. 9). The working state is complete contact, i.e., when the core of the braking part is driven by the force switching mechanism and moves outwards, the disc is set to move outwards and relieve braking. When the thrust of the force switching mechanism is removed, the tripping spring is exerted on the core, making a close contact between the disc and the brake shoe to realize braking. The tooth block in partial contact is in the compensation state. When the friction lining of the disc is worn out to a certain extent, under the action of the driving block, the core 22 makes a relative outward movement with respect to the disc 21. The tooth block 25 moves downwards in the notch against the action of the spring 27a, and a tooth on the block slips into the next gear ring of the disc. That is, the tooth comes into complete contact, the working state, and the tooth that was originally in complete contact is changed to partial contact, the compensation state.

It should be emphasized that the compensation system 23 in embodiment 2 may be used in other brakes having disc braking parts according to its principle, like the descriptions of the embodiments 3, 4, 5, and 6 hereafter.

Figure 10:
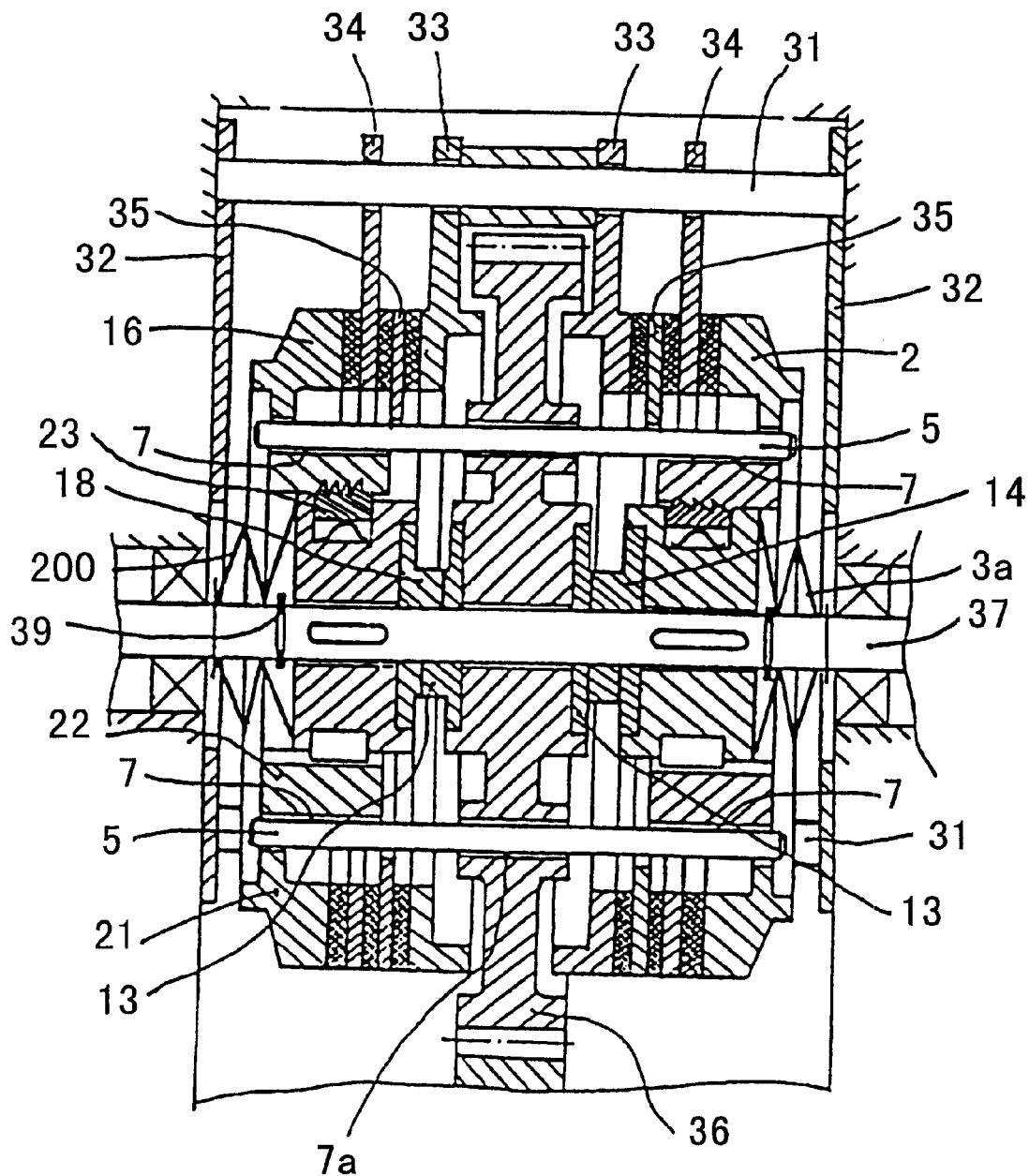
FIG. 10 is an axial-sectional view of the third embodiment of the invention.

The embodiment 3 of the invention is shown in FIG. 10. Parts that are the same or similar to those of the above-mentioned embodiments are scaled out with the same labels.

FIG. 10 is the cross-sectional view of the axial structure of the embodiment. The embodiment is a variant of the above-mentioned embodiment, in which the fixed seat comprises three connecting axes 31 and two side plates 32 connected to both ends of the three axes. Brake shoe 6 comprises two discrete discs 33, which are secured on the connecting axle 31. Braking part 2 and braking part 16 and the two discrete discs 33 correspond to the two discrete discs 33 of the brake shoe 6. Between the braking part 2 and braking part 16 and two discrete discs 33, the brake shoe 34 is connected on the connecting axle 31, and is movable along the axle; on the side face of the brake shoe 34, coaxial servo inner disc braking part 35, the braking part, the brake shoe and the friction surface of the servo inner disc braking part are clutched in mutual one-to-one correspondence. Thus, the multi-plate double disc structure takes the driving part 11 as an intermediate wheel. In the embodiment, the intermediate wheel is the transmission gear 36, installed between the two discrete discs 33, and suited on the output transmission shaft 37. The output transmission shaft 37 is the passive driven member 9, and plays a part in connection as the connecting rod 12 of the braking part. The sliding pin 5 threads the transmission gear 36, brake shoes 2, 16 and the servo inner disc braking part 35, both of its ends being located in the sliding holes of the braking part 2 and braking part 16, respectively. The sliding hole 7 may also be modified to fit in a coupling with the sliding pin 5, and may be set up on the transmission gear 36. The spring 3 and the spring 20 are mounted on both ends of the output transmission shaft 37. The acting block 13 in the force-switching mechanism is a two block discrete part, connected to the two end faces of the transmission gear 36, respectively. When the driving block 14 and driving block 18 exert a driving thrust on the braking part 2 and braking part 16, the two braking parts 2 and 16 overcome the acting forces of the tripping springs 3a and 20a to move outboard, enabling the brake shoe 34 and servo inner disc braking part 35 to be in a loosened condition, without pressure and relieved braking. When the thrust of the driving blocks 14 and 18 are canceled, the action comes from the two tripping springs, and the braking parts 2 and 16 exert pressure on the servo inner disc braking part 35 and the brake shoe 34. This moves them inwards, until they make a mutually close contact and achieve braking.

When the brake is released in embodiment 3, if the acting forces of the tripping springs 3a and 20a are adequate, the braking parts 2, 16 may be restricted to move in a limited range, and may also be restricted in position and limited in movement via setting up circles 39, ensuring that the concave-convex surface of the acting block 13 does not pass the convex-concave surface of the driving block 14. No sliding pins and sliding holes are needed to be set up in this type of structure, and direct force transmissions are carried out by the acting block 13 and the driving block 14. As described in embodiment 1, here, only the braking part 2, and not the braking part 16, is installed.

Figure 11:
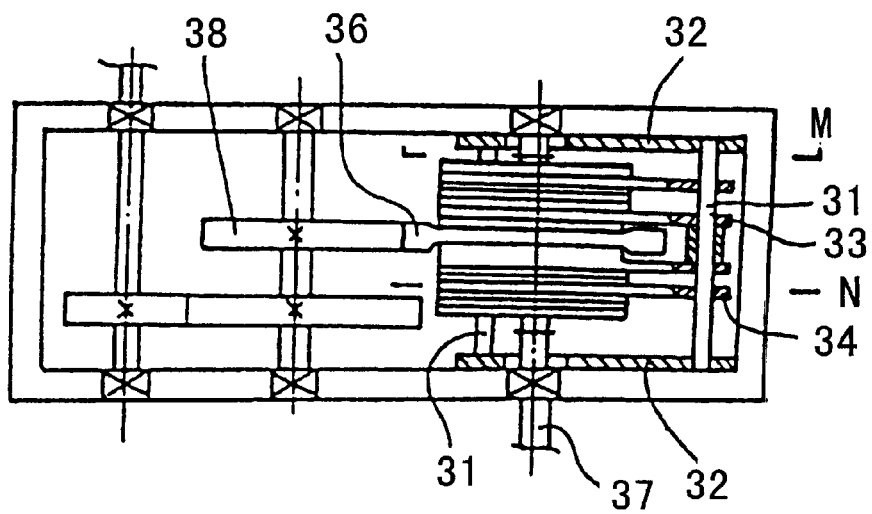
FIG. 11 is a top view of the invention applied in the reduction gear.
Figure 12:
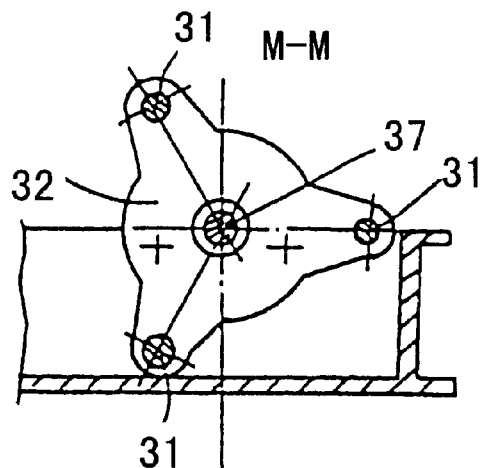
FIG. 12 is a cross-sectional view taken along the M—M line in FIG. 11.
Figure 13:
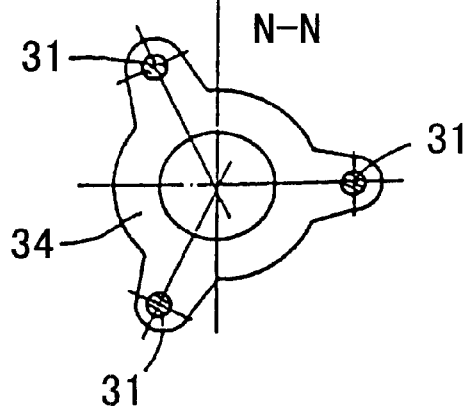
FIG. 13 is a cross-sectional view taken along the N—N line in FIG. 11.

The fourth embodiment is shown in FIG. 11–FIG. 13, in which the same or similar parts as in the above-mentioned embodiment are scaled out with the same labels.

This embodiment is the living example of the application of the embodiment 3 in reduction gears, the relevant connecting mechanism being shown in FIG. 11 to FIG. 13. The two side plates 32 are connected to the two inwalls of the reduction gear box, respectively. Transmission gear 36, i.e., the driving member, is engaged with the fore drive gear 38, and the passive driven member is the output transmission shaft 37. Concerning the connecting axle 31, the discrete disc 33 and the brake 34 in the drawings are the same as in embodiment 3, so their description is not repeated herein.

Figure 14:
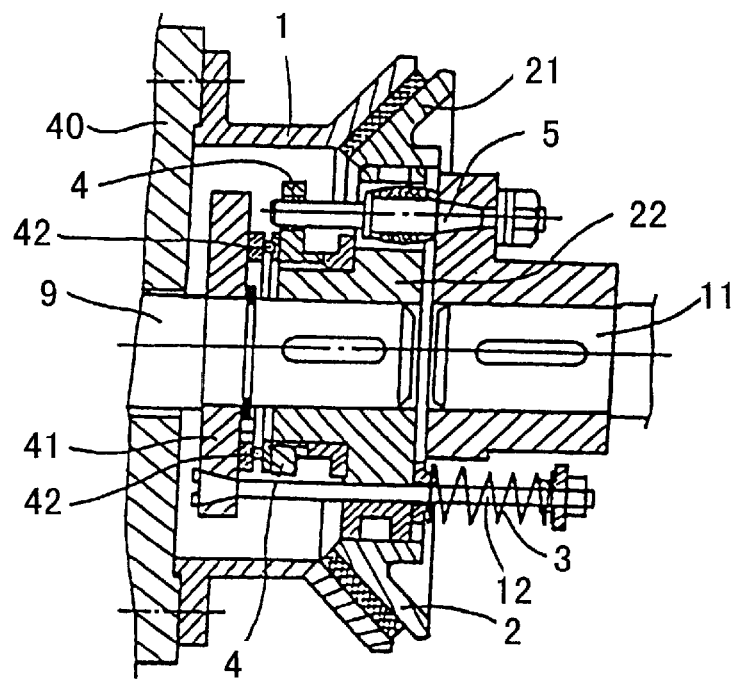
FIG. 14 is an axial-sectional view of the fifth embodiment of the invention.

The fifth embodiment of the invention is shown in FIG. 14, in which the same or similar parts as in the above-mentioned embodiments are scaled out with the same labels.

In the embodiment 5, both friction surfaces of the braking part 2 and the fixed seat 1 are conical surfaces.

The fixed seat 1 is directly secured on the casing (outer shell) of the driven member 40. The braking part 2 has a conical friction surface comprising the conical disc 21 and core 22. The same compensation system as in embodiment 2, i.e., the improved gear ring structure (not shown in the figure), is adopted here. One end of the connecting rod 12 is linked on an internal dead plate 41. A bearing 42 is mounted between the force switching mechanism 4 and the internal dead plate 41 to reduce the friction force of the force switching mechanism. The remaining members comprise the driving member 11, driven member 9, sliding pin 5 and the spring 3, and it is unnecessary to go into details.

Figure 15:
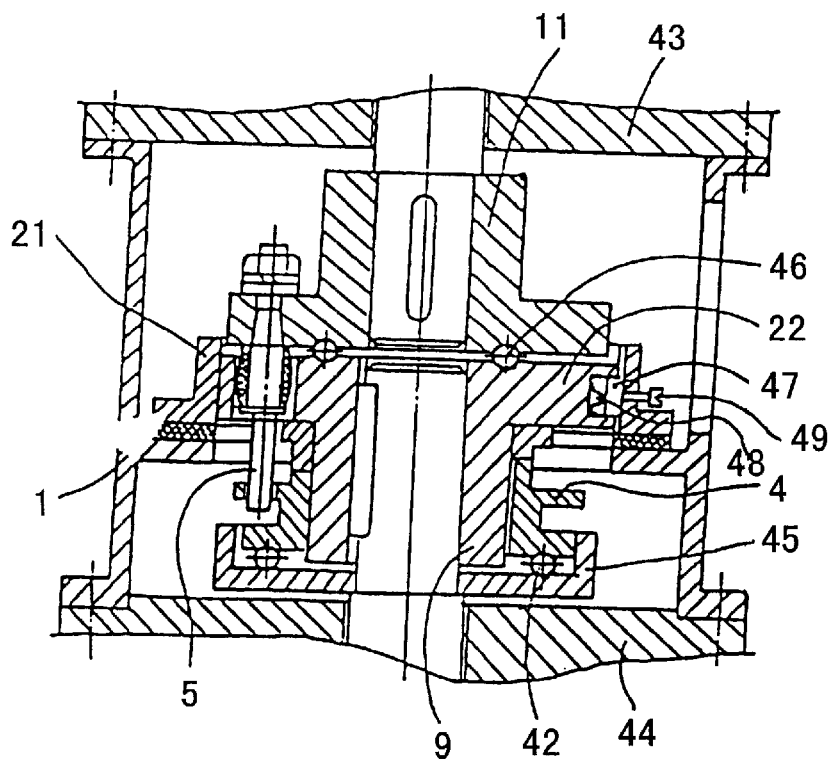
FIG. 15 is an axial-sectional view of the sixth embodiment of the invention.

The sixth embodiment of the invention is shown in FIG. 15, in which the same or similar parts are sectioned out in the same labels.

In this embodiment, the gravity force of the driving member 11 and the driven member 9 (indicating the vertical installation with the driving member on the top) are used as the acting force and braking force to restrict the limiting displacement of the force switching mechanism. Thus, no connecting rod is needed. The fixed seat is also taken as the coupling member of the upper driving member casing 43 and the lower driven member casing 44, and a bearing 42 is mounted between the force switching mechanism 4 and the thrust plate 45. Meanwhile, a bearing 46 is mounted between the driving member and driven member to reduce friction force. The braking part 2 also comprises the disc 21 and the core 22, and the above-mentioned compensation system may be adopted between the disc 21 and the core 22, or direct thread mating and a set-up key 47 and the spring 48 may be employed. A screw 49 is installed on the key slot position of the disc 21, and when the friction part is worn out, the key 47 is pushed up to the rotatable position by the screw 49. Thus the friction gap can be adjusted.

Figure 17:
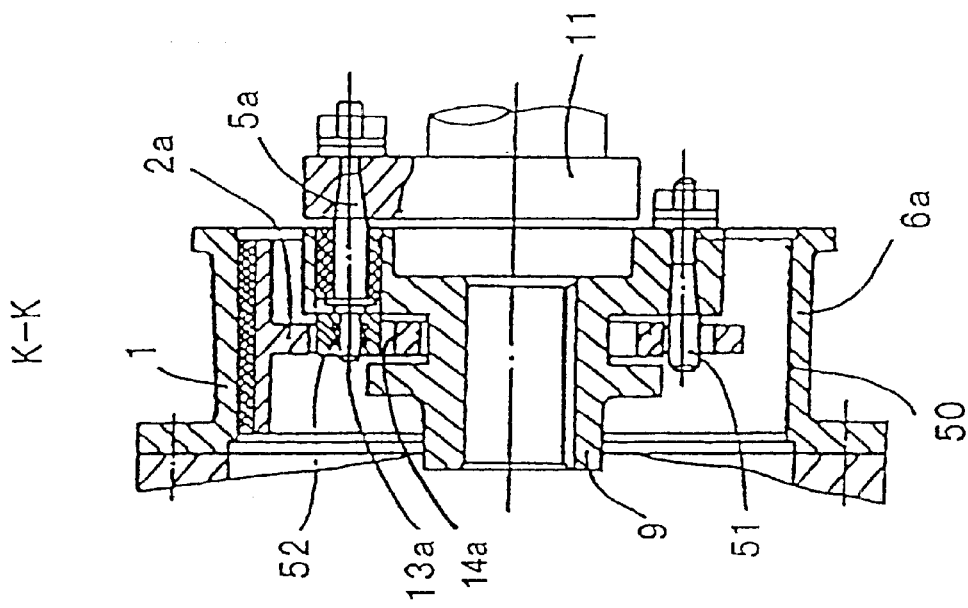
FIG. 17 is a cross-sectional view taken along the K—K line in FIG. 16.
Figure 16:
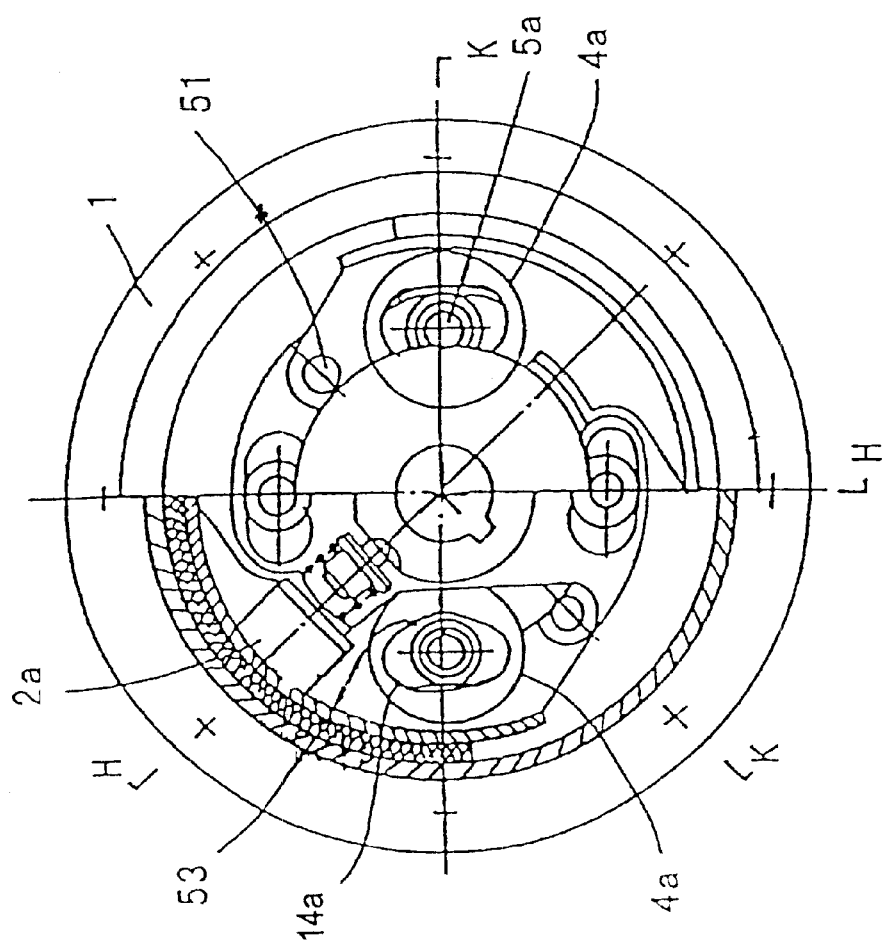
FIG. 16 is a cross-sectional view of the seventh embodiment of the invention.
Figure 18:
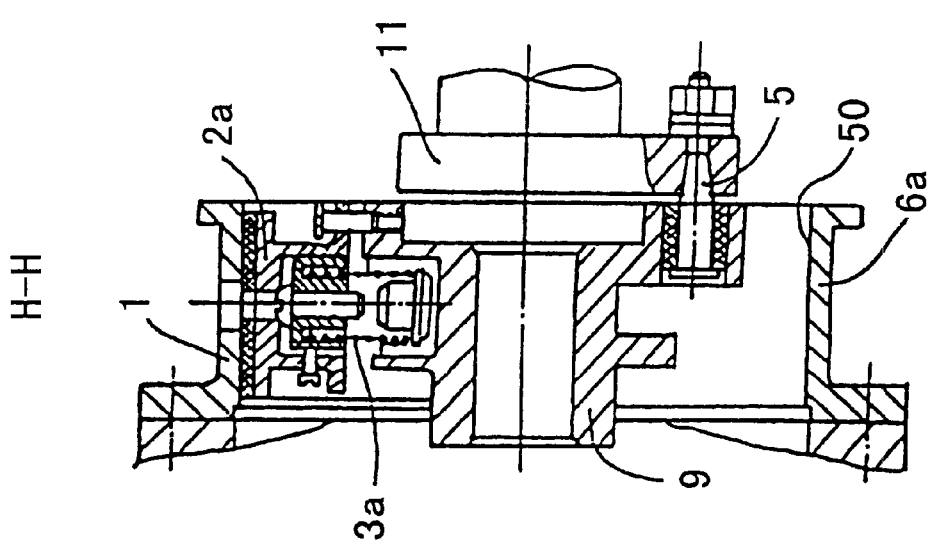
FIG. 18 is a cross-sectional view taken along the H—H line in FIG. 16.

The seventh embodiment of the invention is shown in FIG. 16–FIG. 18. In that embodiment, the same or similar parts in action are scaled out with the same labels.

The structure of this embodiment is different from the above-mentioned embodiment, in which the force switching mechanism transformed the active force into a radial force against the brake acting force of the spring to relieve braking. The fixed seat 1 may be secured on the casing of the driven member, and may be secured in other positions. The inside of the fixed seat 1 plays a part in the brake shoe, and is labeled 6a in the diagram. The cylindrical surface on the brake shoe 6a is a braking friction surface called the braking cylindrical surface 50. The form of the braking part is a hoof block 2a, and is articulated on the driven member 9 by the support pin 51. The action of the acting block 13a in the radial force switching mechanism 4a is served by the front end of the sliding pin 5a. The acting surface of the driving block 14a is the mating surface 53, and is directly secured on the hoof block 2a. The driving block 14a and the hoof block 2a may also merge into a whole part, which is the situation in this embodiment. In order to reduce the driving friction of the sliding pin 5a, a rolling element is installed at the front end of 5a. In order to avoid producing a radial component of force between the driving member 11 and driven member 9, the radial force switching mechanism 4a is preferably evenly arranged relative to the center of movement of the moving body. A two-part symmetric distribution is adopted in this embodiment. When the driving member receives an active force, the sliding pin 5a is brought into movement, and the rolling element suppresses the mating surface (see FIG. 16). This produces a downward radial component force against the acting force of the spring 3a, enabling the brake hoof shoe 2a to move inwards in the radial direction. This releases the braking of the braking cylindrical surface, allowing the driving member 11 and driven member 9 to run in normal operation. When the driving part 11 loses the active force, the sliding pin 5a makes a reverse movement relative to the mating surface 53, and recovers the braking under the action of the acting force of the spring 3a.

Figure 19:
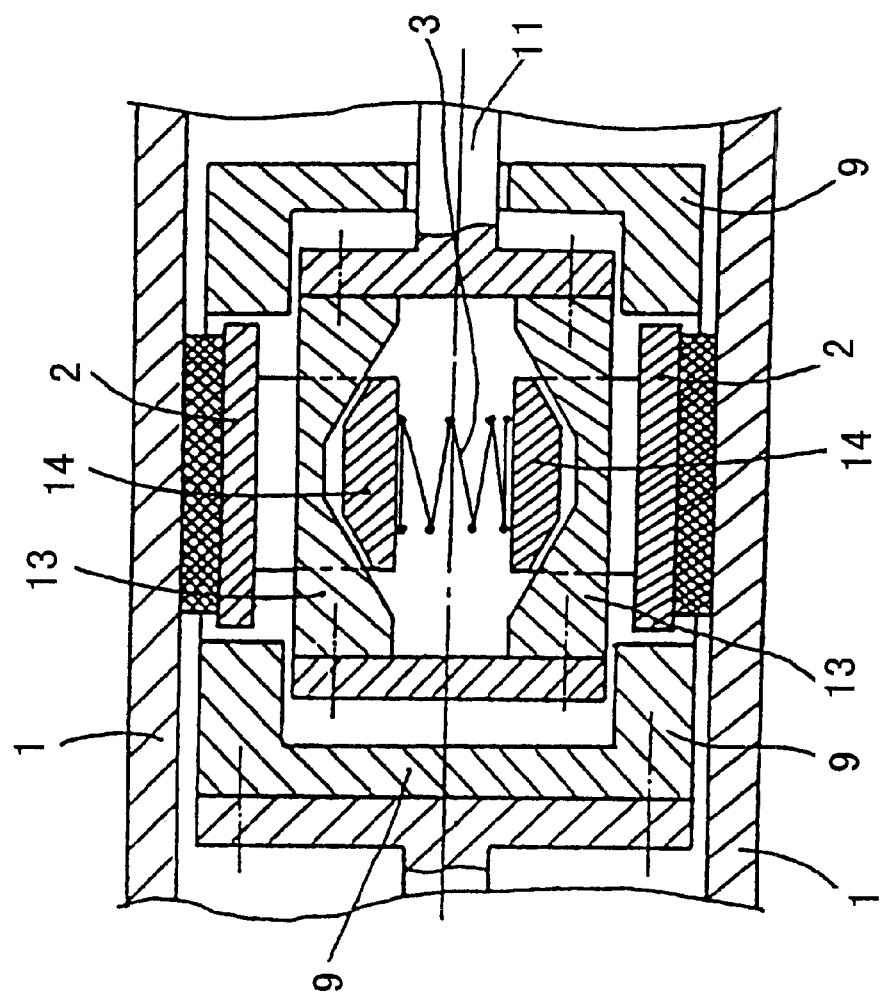
FIG. 19 is the eighth embodiment of the invention.

The eighth embodiment of the invention is shown in FIG. 19, in which the driving member brings the driven member into rectilinear movement (i.e. the axial movement in the left and right directions in the diagram).

As shown in FIG. 19, the braking part 2 and the driving block 14 are merged into a whole part. The two braking parts 2 are located in the notch of the two side boards of the driven member 9, respectively, and the acting block is located in the notch between the braking part 2 and the driving block 14. The slope of the driving block 14 is fitted in the slope of the acting block 13, and both ends of the spring 3 connect to the inner end of the driving block 14. The friction lining on the outboard side of the braking part 2 clutches the braking friction surface of the fixed seat 1. When the driving member 11 acquires active force and makes a rectilinear movement, due to the slope action of the acting block 13, the driving block 14 may hold down the spring 3 and move inwards. This causes the braking part 2 and the braking friction surface to separate, relieving braking of the driven member 9, and the driven member 9 moves, following the driving member 11. When the driving member 11 loses the active force, the spring 3 comes into action, and the acting block 13 and the braking part 2 merge into a whole part to move from inside to the outboard. The braking part 2 contacts the braking friction surface and achieves braking of the driven member 9.

The brake in the invention has an established force switching mechanism in the various relevant structures in the embodiment, using the active force of the driving member against the brake acting force to relieve braking. This enables the passive driven member and the driving member to retain normal operation.

In comparison to existing technologies, the brake of the invention has significant, substantial features: No additional power setting needs to be installed, the structure is simple, and in its normal operation process, it is energy saving, reliable in braking, and has an extensive range of applications. This is especially so when it is used in mine equipment that is required to be explosion-proof, since no additional power source (like electromagnets, etc.) is needed, and thus the work will be completely safe and reliable.

The brake of the invention shall have vast application vistas in mining, metallurgical, lifting, architectural and general machinery equipment.

What is claimed is:

1. A brake comprising a fixed seat, a friction brake shoe, a braking part, a braking spring, an acting block, and a driving block, wherein said acting block is connected with a driving member and matched to an acting face of said driving block, said driving block is connected with said braking part, said braking spring has a first end connected to a driven member and a second end connected to said braking part, said braking part is capable of engaging with or disengaging from said friction brake shoe, and articulated to the driven member by a support pin.

2. The brake according to claim 1 comprising a plurality of driving blocks arranged in an equidistance, wherein said acting block is served by the front end of a sliding pin.

3. The brake according to claim 2 further comprising a rolling part installed on said acting block.

4. The brake according to claim 1 further comprising a rolling part installed on said acting block.

5. The brake according to claim 1, wherein said driving block is secured on the braking part.

\* \* \* \* \*